United States Patent
Amiri et al.

(10) Patent No.: US 12,045,707 B2
(45) Date of Patent: Jul. 23, 2024

(54) FORECASTING TIME-SERIES DATA IN A NETWORK ENVIRONMENT

(71) Applicant: Ciena Corporation, Hanover, MD (US)

(72) Inventors: Maryam Amiri, Ottawa (CA); Petar Djukic, Ottawa (CA); Todd Morris, Stittsville (CA)

(73) Assignee: Ciena Corporation, Hanover, MD (US)

( * ) Notice: Subject to any disclaimer, the term of this patent is extended or adjusted under 35 U.S.C. 154(b) by 367 days.

(21) Appl. No.: 16/687,902

(22) Filed: Nov. 19, 2019

(65) Prior Publication Data
US 2021/0150305 A1     May 20, 2021

(51) Int. Cl.
| | |
|---|---|
| G06N 3/02 | (2006.01) |
| G06N 5/02 | (2023.01) |
| H04L 41/14 | (2022.01) |
| H04L 41/147 | (2022.01) |
| H04L 41/16 | (2022.01) |
| G06Q 10/04 | (2023.01) |

(52) U.S. Cl.
CPC .................. G06N 3/02 (2013.01); G06N 5/02 (2013.01); H04L 41/145 (2013.01); H04L 41/147 (2013.01); H04L 41/16 (2013.01); G06Q 10/04 (2013.01)

(58) Field of Classification Search
CPC ....... G06N 3/02; H04L 41/145; H04L 41/147; H04L 41/16
USPC ........................................................ 706/25
See application file for complete search history.

(56) References Cited

U.S. PATENT DOCUMENTS

| | | | |
|---|---|---|---|
| 8,887,217 B2 | 11/2014 | Salem et al. | |
| 9,819,565 B2 | 11/2017 | Djukic et al. | |
| 9,838,271 B2 | 12/2017 | Djukic et al. | |
| 10,015,057 B2 | 7/2018 | Djukic et al. | |
| 10,270,564 B2 | 4/2019 | Djukic et al. | |
| 2007/0087756 A1* | 4/2007 | Hoffberg | G06Q 20/40 |
| | | | 455/450 |
| 2015/0100295 A1 | 4/2015 | Jetcheva et al. | |
| 2016/0112327 A1 | 4/2016 | Morris et al. | |

(Continued)

FOREIGN PATENT DOCUMENTS

JP      2005 157685 A     6/2005

OTHER PUBLICATIONS

Jan. 29, 2021, International Search Report and Written Opinion for International Patent Application No. PCT/US2020/060843.

(Continued)

*Primary Examiner* — Suraj M Joshi
(74) *Attorney, Agent, or Firm* — Baratta Law PLLC; Lawrence A. Baratta, Jr.

(57) ABSTRACT

Systems, methods, and computer-readable medium for forecasting a time-series are provided. In one implementation, a method is configured to include a step of providing a time-series to a neural network including one or more branches for processing one or more portions of the time-series. In each of the one or more branches, the method includes separating the respective portion of the time-series into individual portions and applying each portion to a respective sub-branch of a plurality of sub-branches of the one or more branches. The method also includes generating forecasting coefficients for each output time point in each of the respective sub-branches and providing a forecast of the time-series based at least on the forecasting coefficients.

20 Claims, 7 Drawing Sheets

(56) References Cited

U.S. PATENT DOCUMENTS

| | | |
|---|---|---|
| 2017/0230267 A1 | 8/2017 | Armolavicius et al. |
| 2018/0300737 A1 | 10/2018 | Bledsoe |
| 2019/0230046 A1 | 7/2019 | Djukic et al. |
| 2020/0372329 A1* | 11/2020 | Oreshkin .............. G06F 1/0321 |

OTHER PUBLICATIONS

Kyle Hsu et al., Unsupervised Learning Via Meta-Learning, arXiv:1810.02334v6 [cs.LG] Mar. 21, 2019, Published as a conference paper at ICLR 2019, pp. 1-24.

Shaoqing Ren et al., Faster R-CNN: Towards Real-Time Object Detection with Region Proposal Networks, Microsoft Research, pp. 1-9.

Kaiming He et al., Mask R-CNN, Facebook AIA Research (FAIR), 2017, pp. 2961-2969.

Douglas Charlton et al., Field measurements of SOP transients in OPGW, with time and location correlation to lightning strikes, Research Article vol. 25, No. 9 | May 1, 2017 | Optics Express 9689, pp. 1-8.

Rob J. Hyndman, Forecasting: principles and practice, 3.3 Hierarchical forecasting, Monash Business School, pp. 1-107.

* cited by examiner

| Algorithm | Average Relative Error (yearly) | Gain over M4 winner (yearly) | Gain over N-BEATS (yearly) | Average Relative Error (monthly) | Gain over M4 winner (monthly) | Gain over N-BEATS (monthly) | Average Relative Error (qtrly) | Gain over M4 winner (qtrly) | Gain over N-BEATS (qtrly) |
|---|---|---|---|---|---|---|---|---|---|
| M4 winner | 13.2% | 0.0% | -2.8% | 12.1% | 0.0% | -0.5% | 9.7% | 0.0% | -3.2% |
| N-BEATS | 12.8% | 2.7% | 0.0% | 12.1% | 0.5% | 0.0% | 9.4% | 3.1% | 0.0% |
| Single-path Fourier | 10.2% | 22.8% | 20.6% | 8.8% | 27.8% | 27.4% | 8.9% | 7.5% | 4.6% |
| Multi-path Fourier | 8.3% | 36.9% | 35.1% | 7.2% | 40.4% | 40.1% | 7.0% | 27.8% | 25.5% |
| Multi-path Wavelet | 6.9% | 47.5% | 46.0% | 5.7% | 53.1% | 52.8% | 5.2% | 46.5% | 44.8% |

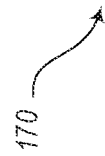

FIG. 9

| Algorithm | Average Relative Error | Gain over Kaggle winner |
|---|---|---|
| Kaggle winner | 37.4% | 0.0% |
| Multi-path Fourier | 35.5% | 5.2% |
| Multi-path Wavelet | 32.8% | 12.4% |

FIG. 10

FORECASTING TIME-SERIES DATA IN A NETWORK ENVIRONMENT

TECHNICAL FIELD

The present disclosure generally relates to networking systems and methods. More particularly, the present disclosure relates to systems and methods for predicting future values of Performance Monitoring (PM) data and the like for a telecommunications network from historical network time-series data.

BACKGROUND

Generally, various forecasting methods have been developed for making predictions about future results of various systems. For example, stockbrokers may utilize forecasting models in an attempt to predict future stock prices. Based on these predictions, recommendations can be made for buying stock if an increase in price is expected, selling existing stock if a decrease in price is expected, or holding onto existing stock if the price is expended to stay the same or increase. An overview of many existing forecasting solutions can be found in the textbook, "Forecasting: Principles and Practice" by Rob J. Hyndman and George Athanasopoulos.

In the environment of telecommunications networks, accurate forecasting can also be beneficial. For example, if it is predicted that existing network equipment will be overworked in the future, it would behoove a network administrator to plan to deploy additional equipment to handle the additional loads that may be expected in the future. Also, forecasting in networking systems may be beneficial with respect to how data packets are routed throughout a network over time.

Since many existing forecasting models are not particularly accurate, a challenge has been offered to forecasting developers to compete against one another. This competition was started in 1982 by Spyros Makridakis and is held about once every ten years. In the competition, a standard set of forecasting datasets is used to evaluate each competitor's forecasting algorithms in a standard way. In the fourth forecasting competition (referred to as the "M4 competition") held in 2018, the best forecasting algorithm was based on a straight forward use of a residual Deep Neural Network (DNN) with the Long Short-Term Memory (LSTM) layers. In addition to the M4 competition, other successful forecasting algorithms have been published. Recently, one such accurate forecasting approach (i.e., the N-BEATS model) has been developed based on a residual DNN.

One problem with classical forecasting solutions is that they are based on low-capacity learning approaches, which may result in at least two main drawbacks with respect to forecasting network data. First, current solutions require a forecasting model for each time-series. Each model is trained to fit the time-series in order to enable forecasting. There may be thousands of time-series data points in a network that require forecasting, imposing a tremendous cost on computation required for training and memory requirements during the forecasting.

Second, current solutions typically require careful model selection by a forecasting expert. Due to their low capacity, current approaches are hard to fit. It is incumbent upon a forecasting expert to select the right model in the forecaster so that it can be fit. However, this approach may result in overfitting in the sense that the model only matches the historical time-series and may not fit the time-series in the future, if the underlying random process changes. It is often necessary for a forecasting expert to select a model that can fit a time-series and then monitor it for overfitting. This approach does not scale in a network setting where there are a large number of data points of the time-series, which are likely changing over time. Thus, the process of training and model evaluations could be automated to overcome these issues.

Even the solutions based on high-capacity approaches using DNNs may not have enough capacity due to their approach to using deep neural networks. For example, the forecast model that won the M4 competition fits the time-series using a series of LSTM layers, which impose a specific structure on the model and limits its capacity.

Another known forecast model (i.e., the N-BEATS model) also has a capacity problem, but for a different reason. The general approach of not imposing the LSTM structure on the model does improve N-BEATS's capacity over the M4 competition winner. However, the capacity of this approach is still limited, due to: (1) the use of Fourier transforms in the output layer and (2) fitting all future points of an output layer to the same function.

Therefore, there is a need in the field of forecasting to provide more effective forecast training methods and forecasting models to overcome the above-mentioned deficiencies of the conventional models.

SUMMARY

The present disclosure provides various systems and methods for training a forecasting model from historical time-series data points and utilizing the forecasting model to predict future data points in a variety of environments, such as a telecommunications network. In one implementation, a non-transitory computer-readable medium is configured to store a forecasting module having instructions. When executed, the instructions cause a processing device to provide a time-series to a neural network including one or more branches for processing one or more portions of the time-series. In each of the one or more branches, the processing device separates the respective portion of the time-series into groups of input time points and applies each input time point group to a respective sub-branch of a plurality of sub-branches of the one or more branches. The instructions of the forecasting module further cause the processing device to generate forecasting coefficients for each group of output time points in each of the respective sub-branches, where each group of output time points may have one or more time points.

According to another implementation, a computing system comprises a processing device and a memory device configured to store a forecasting module. Again, the forecasting module includes instructions which, when executed, cause the processing device to provide a time-series to a neural network including one or more branches for processing one or more portions of the time-series. In each of the one or more branches, the processing device is configured to separate the respective portion of the time-series into groups of input time points and apply each input time point group to a respective sub-branch of a plurality of sub-branches of the one or more branches. The processing device also generates forecasting coefficients for each group of output time points in each of the respective sub-branches, where each group of output time points may have one or more time points.

According to yet another implementation, a method comprises the steps of providing a time-series to a neural network including one or more branches for processing one or more portions of the time-series. In each of the one or more branches, the method also includes the steps of separating the respective portion of the time-series into groups of input time points and applying each input time point group to a respective sub-branch of a plurality of sub-branches of the one or more branches. Then, the method includes the step of generating forecasting coefficients for each group of output time points in each of the respective sub-branches, where each group of output time points may have one or more time points.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIG. 9 is a table showing a comparison between highly-regarded forecasters and the forecasters of the present disclosure using a dataset from the M4 forecasting competition; and FIG. 10 is another table showing a comparison between a Kaggle forecaster competition winner and the forecasters of the present disclosure using a dataset from the Kaggle competition.

DETAILED DESCRIPTION

The present disclosure relates to systems and methods for forecasting future results based on time-series data. The forecast model of the present disclosure starts with a Deep Neural Network (DNN) with an architecture using a time-series decomposition approach used in some other forecasting approaches. However, the capacity of the DNN of the present disclosure can be increased by enabling it to devise a "separate" time waveform for each forecasted data point instead of providing a "common" time waveform for all the data points as is done in conventional systems. The forecasting model of the present disclosure is able to improve prediction performance, even on a dataset having complicated or only partially available periodic patterns.

Figure 1:
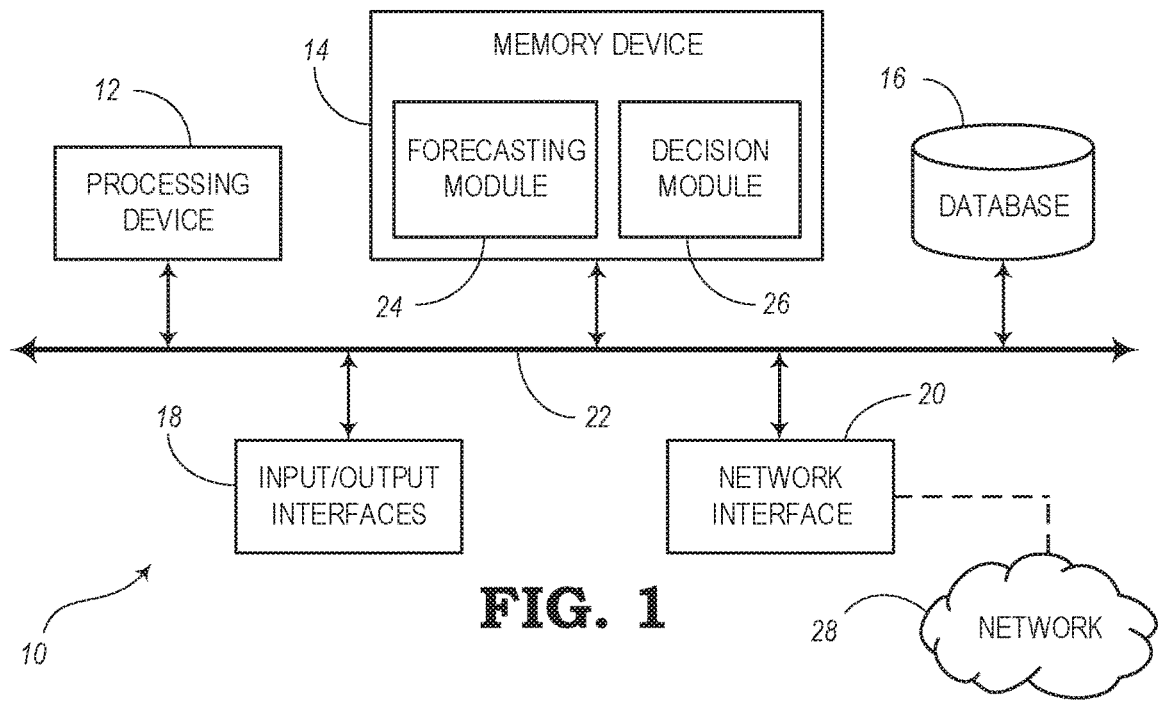
FIG. 1 is a block diagram illustrating a computing system configured to perform forecasting processes on time-series data, according to various embodiments of the present disclosure.

FIG. 1 is a block diagram of a computing system 10 configured to obtain a time-series. From the time-series, the computing system 10 is configured to forecast future data points and provide output regarding the forecast results. Furthermore, according to some embodiments, the computing system 10 may also be configured to make decisions based upon the forecast and/or enact (or instruct other systems to enact) various predetermined actions. In this embodiment, the computing system 10 includes a processing device 12, a memory device 14, a database 16, input/output (I/O) interfaces 18, and a network interface 20, each of which may be interconnected via a local interface 22.

The memory device 14 may be configured as non-transitory computer-readable media and may store one or more software programs, such as a forecasting module 24 and a decision module 26. The software programs may include logic instructions for causing the processing device 12 to perform various steps. For example, the forecasting module 24 may be configured to enable the processing device 12 to process a time-series to calculate a forecast of future data points. The decision module 26 may be associated with the forecasting module 24 and may be configured to make decisions about how to handle the results of the forecast provided by the forecasting module 24.

According to some embodiments, the computing system 10 may be connected within a telecommunications network for obtaining time-series data from the telecommunications network and performing predetermined actions (or giving instructions about actions to be taken) on the telecommunications network based on the forecast results. The network interface 20 of the computing system 10 may, therefore, be connected to a network 28 and obtain time-series information about the network 28. The details of the forecasting module 24 and decision module 26 are described in more detail below for calculating a forecast of various conditions of the network 28 and enacting change on the network 28 as needed based on the forecast. However, the computing system 10 may be utilized in other environments for forecasting other types of systems.

Those skilled in the pertinent art will appreciate that various embodiments may be described in terms of logical blocks, modules, circuits, algorithms, steps, and sequences of actions, which may be performed or otherwise controlled with a general-purpose processor, a DSP, an application-specific integrated circuit (ASIC), a field-programmable gate array, programmable logic devices, discrete gates, transistor logic, discrete hardware components, elements associated with a computing device, or any suitable combination thereof designed to perform or otherwise control the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, those skilled in the pertinent art will appreciate that the various illustrative logical blocks, modules, circuits, algorithms, and steps described in connection with the embodiments described in the present disclosure may be implemented as electronic hardware, computer software, or any suitable combinations thereof. To clearly illustrate this interchangeability of hardware and software, various illustrative components, blocks, modules, circuits, algorithms, and steps have been described herein in terms of their general functionality. Whether such functionality is implemented in hardware or software depends upon the particular application and design constraints, and those skilled in the pertinent art may implement the described functionality in various ways to suit each particular application, but such implementation decisions should not be interpreted as causing a departure from the scope or spirit of the present disclosure. Additionally, the various logical blocks, modules, circuits, algorithms, steps, and sequences of actions described herein can be considered to be embodied entirely within any form of computer readable storage medium having stored therein a corresponding set of computer instructions that upon execution would cause an associated processor to perform the functionality described herein. Thus, the various aspects and embodiments disclosed herein may be embodied in a number of different forms, all of which have been contemplated to be within the scope or spirit of the claimed subject matter. In addition, for each of the embodiments described herein, the corresponding form of any such embodiments may be described herein as, for example, "logic configured to" perform the described action.

The methods, sequences and/or algorithms described in connection with the embodiments disclosed herein may be embodied directly in hardware, in a software module executed by a processor, or any suitable combination thereof. Software modules may reside in memory controllers, DDR memory, RAM, flash memory, ROM, electrically programmable ROM memory (EPROM), electrically erase programmable ROM (EEPROM), registers, hard disks, removable disks, CD-ROMs, or any other storage medium known in the art or storage medium that may be developed in the future. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal or other computing device. In the alternative, the processor and the storage medium may reside as discrete components in a user terminal or other computing device.

In one or more exemplary embodiments, the control functions described may be implemented in hardware, software, firmware, or any combination thereof. If implemented in software, the functions may be stored on or transmitted over as one or more instructions or code on a computer-readable medium. Computer-readable media includes both storage media and communication media, including any medium that facilitates transferring a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage, or other magnetic storage devices or media that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In the illustrated embodiment shown in FIG. 1, the computing system 10 may be a digital computer that, in terms of hardware architecture, generally includes the processing device 12, the memory device 14, the database 16, the I/O interfaces 18, and the network interface 20. The memory device 14 may include a data store, database (e.g., the database 16), or the like. It should be appreciated by those of ordinary skill in the art that FIG. 1 depicts the computing system 10 in a simplified manner, where practical embodiments may include additional components and suitably configured processing logic to support known or conventional operating features that are not described in detail herein. The components (i.e., 12, 14, 16, 18, 20) are communicatively coupled via the local interface 22. The local interface 22 may be, for example, but not limited to, one or more buses or other wired or wireless connections. The local interface 22 may have additional elements, which are omitted for simplicity, such as controllers, buffers, caches, drivers, repeaters, receivers, among other elements, to enable communications. Further, the local interface 22 may include address, control, and/or data connections to enable appropriate communications among the components 12, 14, 16, 18, 20.

The processing device 12 is a hardware device adapted for at least executing software instructions. The processing device 12 may be any custom made or commercially available processor, a central processing unit (CPU), an auxiliary processor among several processors associated with the computing system 10, a semiconductor-based microprocessor (in the form of a microchip or chipset), or generally any device for executing software instructions. When the computing system 10 is in operation, the processing device 12 may be configured to execute software stored within the memory device 14, to communicate data to and from the memory device 14, and to generally control operations of the computing system 10 pursuant to the software instructions.

It will be appreciated that some embodiments of the processing device 12 described herein may include one or more generic or specialized processors (e.g., microprocessors, Central Processing Units (CPUs), Digital Signal Processors (DSPs), Network Processors (NPs), Network Processing Units (NPUs), Graphics Processing Units (GPUs), Field Programmable Gate Arrays (FPGAs), and the like). The processing device 12 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry or logic" that is "configured to or adapted to" perform a set of operations, steps, methods, processes, algorithms, functions, techniques, etc., on digital and/or analog signals as described herein for the various embodiments.

The I/O interfaces 18 may be used to receive user input from and/or for providing system output to one or more devices or components. The user input may be provided via, for example, a keyboard, touchpad, a mouse, and/or other input receiving devices. The system output may be provided via a display device, monitor, graphical user interface (GUI), a printer, and/or other user output devices. I/O interfaces 18 may include, for example, a serial port, a parallel port, a small computer system interface (SCSI), a serial ATA (SATA), a fiber channel, InfiniBand, iSCSI, a PCI Express interface (PCI-x), an infrared (IR) interface, a radio frequency (RF) interface, and/or a universal serial bus (USB) interface.

The network interface 20 may be used to enable the computing system 10 to communicate over a network, such as the telecommunications network 28, the Internet, a wide area network (WAN), a local area network (LAN), and the like. The network interface 20 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 20 may include address, control, and/or data connections to enable appropriate communications on the telecommunications network 10.

The memory device 14 may include volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the memory device 14 may incorporate electronic, magnetic, optical, and/or other types of storage media. The memory device 14 may have a distributed architecture, where various components are situated remotely from one another, but can be accessed by the processing device 12. The software in memory device 14 may include one or more software programs, each of which may include an ordered listing of executable instructions for implementing logical functions. The software in the memory device 14 may also include a suitable operating system (O/S) and one or more computer programs. The operating system (O/S) essentially controls the execution of other computer programs, and provides scheduling, input-output control, file and data management, memory management, and communication control and related services. The computer programs may be configured to implement the various processes, algorithms, methods, techniques, etc. described herein.

The memory device 14 may include a data store (e.g., database 16) used to store data. In one example, the data store may be located internal to the computing system 10 and may include, for example, an internal hard drive connected to the local interface 22 in the computing system 10. Additionally, in another embodiment, the data store may be located external to the computing system 10 and may include, for example, an external hard drive connected to the I/O interfaces 18 (e.g., SCSI or USB connection). In a further embodiment, the data store may be connected to the computing system 10 through a network and may include, for example, a network-attached file server.

Moreover, some embodiments may include a non-transitory computer-readable storage medium having computer readable code stored in the memory device 14 for programming the computing system 10 or another processor-equipped computer, server, appliance, device, circuit, etc., to perform functions as described herein. Examples of such non-transitory computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by the processing device 12 that, in response to such execution, cause the processing device 12 to perform a set of operations, steps, methods, processes, algorithms, functions, techniques, etc. as described herein for the various embodiments.

In operation, the network interface 20 is able to obtain a time-series of one or more characteristics or parameters of a particular environment. For instance, the network interface 20 may obtain network time-series data regarding various conditions or features of the network 28. The time-series information may be obtained by using any suitable measurement devices for automatically measuring the information or by any other suitable manner.

A "time-series" is a series of data points obtained progressively over time. In many cases, a time-series may be plotted in a graph with time referenced on the x-axis and some metric, characteristic, or parameters referenced on the y-axis. The time-series may be a sequence of measurements taken at equally-spaced points in time. From the time-series data, the forecasting module 24 is configured to analyze the information to extract meaningful characteristics of the data to devise a forecast or prediction of future values based on the previously-obtained values.

The computing system 10 may be configured as an Artificial Neural Network (ANN) device for processing the time-series in a logical manner to receive input (e.g., time-series data), performing certain processing on the input (e.g., forecasting), and providing some output based on the processing steps (e.g., making changes to the network 28). The ANN device may be configured to process the pieces of information according to a hierarchical or layered arrangement, where the lowest layer may include the input, and the highest layer may include the output. One or more intermediate deep-learning layers may be involved in processing the input to arrive at reasonable outputs. A Deep Neural Network (DNN) may have multiple intermediate layers each having a set of algorithms designed to recognize patterns through clustering, classifying, etc. The recognized patterns may be numerical patterns or vectors In the environment of a telecommunications network, forecasting can be a fundamental service that can be optimized to enable more efficient network operations. Forecasting may be applicable for the purpose of planning and provisioning network resources that may be needed in the future based on trends. Forecasting in the telecommunications environment may also be useful for operating virtualized network services and for proactively performing maintenance on equipment before the equipment fails.

With the configuration of FIG. 1, the computing system 10 may be employed as a closed-loop forecasting system. Other than the network 28, the computing system 10 can forecast time-series data for use in a number of different environments. When used with the network 28, the forecasting module 24 may be configured to allow a network administrator to enact certain changes to the network 28 based on the forecasting results. For example, one use case of the forecasting processes is for network planning/provisioning. The forecasting module 24 may forecast long-term network demands for network equipment planning. The forecasting module 24 may also forecast medium-term/periodic network demands for proactive connection re-routing and may include a decision to delay equipment purchases. Also, the forecasting module 24 may also be configured to forecast short-term congestion on the network 28 using link utilization information and/or packet loss information. Also, forecasts of congestion may be used for proactively re-routing connections in the network 28. The re-routing may also be based on additional information of the network 28, such as service factors like Quality of Service (QoS) and/or Quality of Experience (QoE) assurance information.

In addition to network planning/provisioning, the results of the forecasting processes of the present disclosure may also be used with respect to virtualized network services. The forecasting module 24 may be configured to forecast server utilization to enable smarter placement of virtualized network functions (VNFs). Also, the forecasting module 24 may be configured to forecast network demand for planning the deployment and/or upgrade of edge computer equipment. The forecasting module 24 may also forecast application demand and instruct the decision module 26 to pre-deploy VNFs, such as content cache, virtual Evolved Packet Core (vEPC), etc.

Another application of the forecasting results may include proactive maintenance of equipment on the network 28. The forecasting module 24 may be configured to forecast alarm threshold crossings and/or forecasting Signal to Interference-plus-Noise Ratio (SINR) degradation that may result in a high Bit Error Ratio (BER).

According to some embodiments, the forecasting module 24 may be utilized based on the following example. The forecasting module 24 may receive a single-variate (or univariate) time-series x(t) for the purpose of forecasting the future values of the time-series x(t). The time-series x(t) may be included within a historical window $w_h$, while future values may be included in a future window $w_f$.

At the time of the forecast, past values of the time-series x(t) are available, starting at time $t_0$. The time-series can, therefore, be written as $x(t_0, t_0+\Delta, \ldots, t_0+(w_h-1)\Delta)$. At the time of the forecast, future values are not known, and the forecasting module 24 may provide an estimate of these future values, written as $\hat{x}(t_0+w_h\Delta, t_0+0, \ldots, t_0+(w_h+w_f)\Delta)$. As the underlying random process evolves, future time-series values become available, so $x(t_0+w_h\Delta, t_0+\Delta, \ldots, t_0+(w_h+w_f)\Delta)$ can be used to check the validity of the estimate $\hat{x}(t_0+w_h\Delta, t_0+0, \ldots, t_0+(w_h+w_f)\Delta)$.

The forecasting module 24, as described in more detail below, may be an AI-based forecaster. When tested, it was determined that the methods of the forecasting module 24 of the present disclosure provides a more accurate forecast than other known forecasters, even the winner of the M4 competition. The dataset of the M4 forecasting competition was applied to the forecasting module 24 of the present disclosure, and the results indicate a significant improvement over the M4 winning forecaster. In particular, the average relative error of the forecasting module 24 was found to be 5.2%, as compared with an average relative error of 9.7% for the winning forecaster. Thus, the forecasting module 24 is able to improve the relative forecast accuracy by 46.5% over the winner of the M4 forecasting competition held in 2018. The forecasting module 24 of the present disclosure also provided an improvement of between 44.8% and 52.8% over the best publicly known forecaster published in May 2019.

Specifically, the forecasting module 24 of the present disclosure includes at least two key steps that make the forecaster work better than the previous approaches. A first key step is that the forecasting module 24 includes a more advanced Deep Neural Network (DNN) architecture than other forecasters. The neural network architecture of the forecasting module 24 creates separate but related forecasting functions for each forecasted time point, as opposed to previous solutions that use one forecasting function for all the forecasted time points. According to some embodiments, this strategy accounts for about two-thirds of our gain of the forecasting module 24.

Another key step involved with the forecasting module 24 is that the forecasting module 24 is configured to generate better forecasting functions. For example, the neural network of the forecasting module 24 uses an inverse Wavelet transform in some layers, which performs better on a wider number of datasets than a Fourier transform. About one-third of our gain of the forecasting module 24 comes from the inverse Wavelet transform processes.

Despite the large size of the DNN of the forecasting module 24, it can be trained for tens of thousands of time-series points in a matter of single-digit minutes on a laptop and can make forecasts on the laptop on the order of milliseconds. When used with a Graphics Processing Unit (GPU) or Tensor Processing Unit (TPU), the computational performance may be significantly better.

Training the Forecaster

Figure 2:
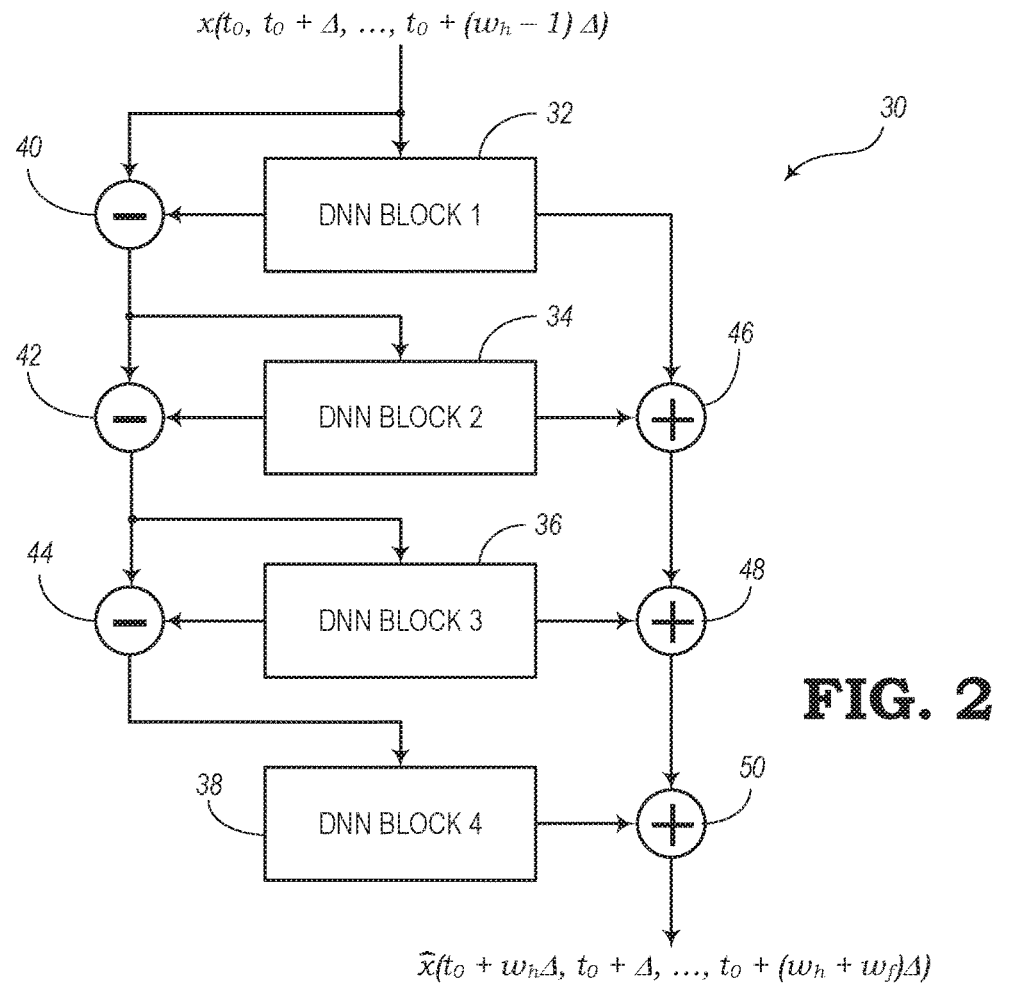
FIG. 2 is a block diagram illustrating the architecture of a residual deep neural network (DNN) for use by the forecasting module shown in FIG. 1, according to various embodiments.

FIG. 2 is a block diagram showing an embodiment of the architecture of a residual deep neural network (DNN) 30 for use by the forecasting module 24. In the illustrated embodiment, the residual DNN 30 may comprise a series of connected DNN blocks, including a first DNN block 32, a second DNN block 34, a third DNN block 36, and a fourth DNN block 38. According to other embodiments, the residual DNN 30 may include more or fewer DNN or processing blocks.

The residual DNN 30 receives an input $x(t_0, t_0+\Delta, \ldots, t_0+(w_h-1)\Delta)$ which represents the time-series taken at a periodicity of $\Delta$. The output of the residual DNN 30 is $\hat{x}(t_0+w_h\Delta, t_0+\Delta, \ldots, t_0+(w_h+w_f)\Delta)$, which is the forecast as described above. In addition to the series of DNN blocks 32, 34, 36, 38, the residual DNN 30 includes subtractors 40, 42, 44, and adders 46, 48, 50.

The first DNN block 32 of the residual DNN 30 receives the entire time-series and provides a partial forecast to the first adder 46. The portion of the time-series that is processed by the first DNN block 32 is output to the first subtractor 40, which also receives the entire time-series. The first subtractor 40 subtracts the already-processed portion of the time-series from the entire time-series to obtain a "residual" portion of the time-series. This residual portion is then supplied to the second DNN block 34 (and to the second subtractor 42).

At this point, the second DNN block 34 processes the residual portion of the time-series and outputs a partial forecast to the first adder 46. The first adder 46 adds the partial forecasts from both the first DNN block 32 and the second DNN block 34 and provides the sum to the second adder 48. The portion of the residual time-series that is processed by the second DNN block 34 is output from the second DNN block 34 to the second subtractor 42. The second subtractor 42 subtracts this portion from the residual time-series to obtain a new residual time-series with the portions already processed by the first and second DNN blocks 32, 34 removed. This residual time-series is then supplied to the third DNN block 36. The third DNN block 34 processes the residual portion of the time-series and outputs a partial forecast to the second adder 48, and so on.

These steps are repeated for each of the DNN blocks 32, 34, 36, 38, where each successive DNN block received a smaller portion of the time-series until all the main portions of the time-series are processed. The partial forecasts from each of the DNN blocks 32, 34, 36, 38 are added up by the adders 46, 48, 50 to provide a final forecast, which is output by the third adder 50.

Each DNN or processing block operates according to its input to create a "backcast," which is the already-processed portion of the time-series and is removed by the subtractors 40, 42, 44 from the input to the next DNN or processing block. Each DNN block also outputs a partial forecast, all of which are aggregated into the output. The input to the residual DNN 30 is $x(t_0, t_0+\ldots, t_0+(w_h-1)\Delta)$, where $x(t)$ represents the time-series data and a vector $w_h$ represents the historical values of time-series. The output of the residual DNN 30 is a forecast $\hat{x}(t_0+w_h\Delta, \ldots, t_0+, t_0+(w_h+w_f)\Delta)$ where $w_f$ represents the future values of the time-series.

As opposed to other forecasting algorithms, the residual DNN 30 of the present disclosure includes multiple DNN blocks that are configured as described below with respect to FIGS. 3-6. The residual DNN 30 may be similar to forecasters that enable very deep networks in the image processing domain. The DNN 30 is referred to as "residual" because, at each stage, some output from that stage is subtracted from its input, and the difference (the "residual") is forwarded to the next stage.

Each block has two outputs: the backcast, which creates (1) the "residual" from the block's input through the subtraction operator of the subtractors 40, 42, 44 and (2) the partial forecast, which is used with partial forecasts from the other blocks to create the full forecast at the output of the residual DNN 30. Conceptually, each processing block is configured to (1) select some information from the time-series at its input, (2) create a partial forecast based on the selected information, and then (3) subtract the selected information from the input to the next block.

Figure 3:
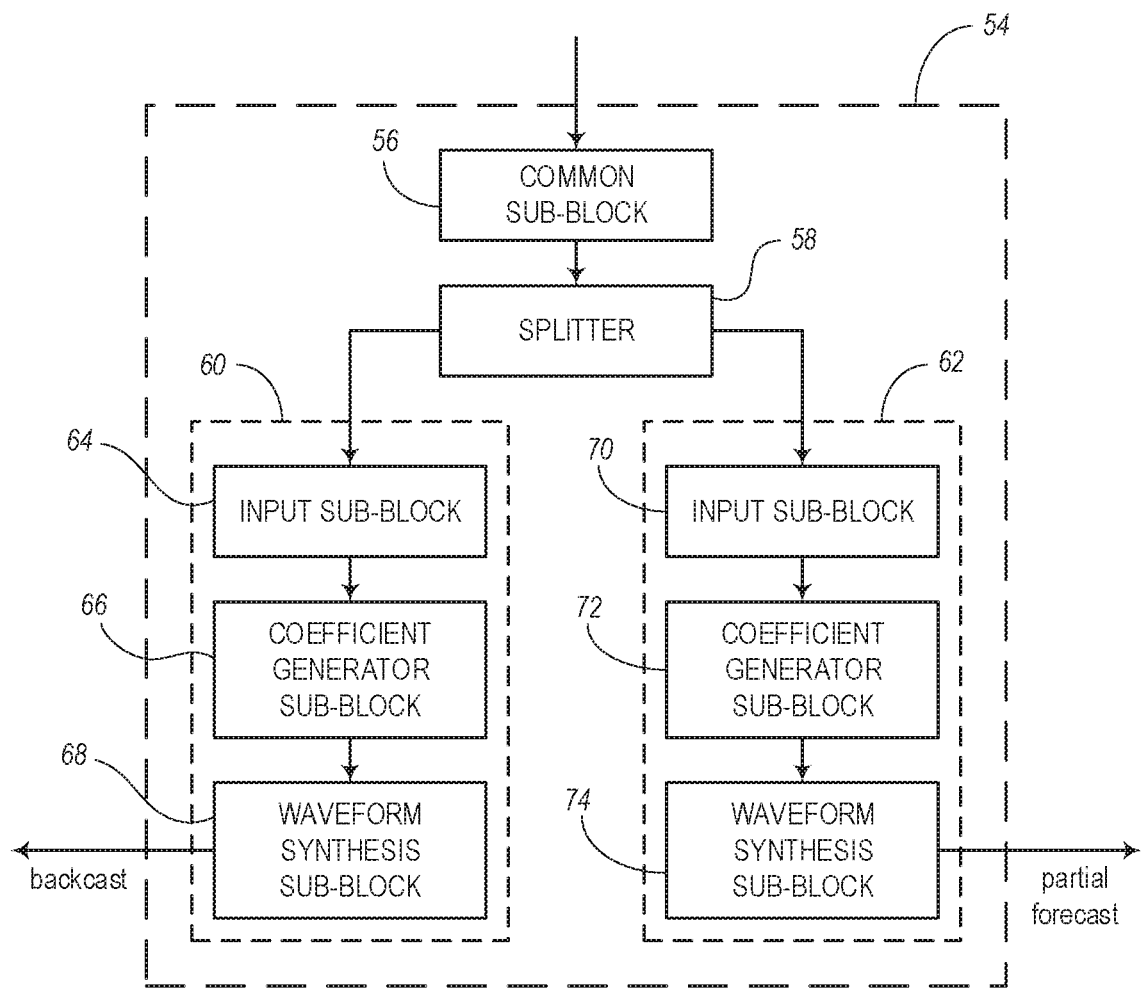
FIG. 3 is a block diagram illustrating the architecture of one of the processing blocks of the residual DNN of FIG. 2, according to various embodiments.

FIG. 3 is a block diagram showing an embodiment of the architecture 54 of one of the DNN blocks 32, 34, 36, 38 of the residual DNN 30. In this embodiment, the DNN block 54 includes a common sub-block 56, and a splitter 58 configured to split or copy the time-series data processed by the common sub-block 56 into two branches, including a backcast branch 60 and a partial forecast branch 62. The output from the backcast branch 60 is provided to the subtractors 40, 42, 44 (FIG. 2) for subtracting the processed portion from the time-series for input to the next stage. The output from the partial forecast branch 62 is provided to the adders 46, 48, 50 (FIG. 2) for adding the partial forecasts together.

According to some embodiments, the backcast branch 60 and partial forecast branch 62 may be implemented differently. The common sub-block 56 and the sub-blocks of the backcast branch 60 and partial forecast branch 62 may be implemented as fully connected blocks, convolutional blocks, recurrent neural network blocks, or a combination thereof.

The output layer of the backcast branch 60 and the output layer of the partial forecast branch 62 may produce a time-series following a specific time-series model. For example, some output layers 68, 74 may include time waveform synthesis functions, such as polynomial functions, inverse Fourier transforms, inverse Wavelet transform, or combinations thereof. Other parameterizable time waveform synthesis functions are also possible and may be used in the output layers 68, 74. For a given time-series model, the sub-blocks of the backcast branch 60 and the sub-blocks of the partial forecast branch 62 may output the parameters of the backcast or forecast output layers.

The input to the DNN block 54 may be processed by the common sub-block 56, followed by the splitter 58. The splitter 58 sends the output of the common sub-block 56 to the backcast branch 60 and the partial forecast branch 62. The two branches 60, 62 of the DNN block 54 create outputs for the backcast and partial forecast inter-block connections shown in FIG. 2.

The backcast branch 60 has three sub-blocks: an input sub-block 64, a coefficient generator sub-block 66, and a waveform synthesis sub-block 68. Similarly, the partial forecast branch 62 also includes an input sub-block 70, a coefficient generator sub-block 72, and a waveform synthesis sub-block 74. The input sub-block 64, 70 creates a new representation of the time-series data given to the DNN block 54. The new representation may be easier for the coefficient generator sub-blocks 66, 72 to process. The coefficient generator sub-blocks 66, 72 may be configured to calculate coefficients/parameters of a waveform synthesis function implemented in the waveform synthesis sub-blocks 68, 74. The waveform synthesis sub-blocks 68, 74 may be configured to generate a time waveform. The time waveform from the waveform synthesis sub-block 68 of the backcast branch 60 is passed to an output of the DNN block 54 as a backcast which is provided to one of the subtractors 40, 42, 44 (FIG. 2). The time waveform from the waveform synthesis sub-block 74 of the partial forecast branch 62 is passed to an output of the DNN block 54 as a partial forecast which is provided to one of the adders 46, 48, 50 (FIG. 2).

The common sub-block 56, the input sub-blocks 64, 70, and the coefficient generator sub-blocks 66, 72 can be implemented with a series of fully-connected layers, with a series of convolution layers followed by deconvolution layers, with an autoencoder, with a series of recurrent neural network layers, or some combination of the aforementioned layers. According to one embodiment, the sub-blocks may be implemented with a series of fully-connected layers, each followed by Rectified Linear Units (ReLUs).

In general, the backcast and partial forecast branches 60, 62 in the same block 54 may use different DNN layer types for the input sub-blocks 64, 70, and coefficient generator sub-blocks 66, 72. A special case of when the input sub-blocks 64, 70 and the coefficient generator sub-blocks 66, 72 may be implemented using the same DNN layer types eliminates the distinction between the corresponding sub-blocks. If they are the same, the resulting family of network architectures may make it easier to optimize hyper-parameters.

Waveform Synthesis

The waveform synthesis sub-blocks 68, 74 may take, as inputs, coefficients generated by the coefficient generator sub-blocks 66, 72, and use them to generate a waveform for the backcast/partial forecast output of the block 54. Waveform synthesis is done with a "waveform generating function," which may include any method that uses coefficients to compute a linear combination of basis vectors. Depending on which aspect of non-stationarity in the time-series is targeted, different orthogonal or non-orthogonal basis vectors may be used, such as polynomial functions, inverse Fourier transforms, and/or inverse Wavelet transforms.

Each branch 60, 62 uses a single waveform synthesis sub-block 68, 74. However, according to some embodiments, a processing block (e.g., DNN block 54) may be created as a network of sub-blocks having a group of different waveform synthesis sub-blocks 68, 74 in each of the backcast and partial forecast branches 60, 62, as described below with respect to FIG. 5. According to other embodiments, the DNN block 54 may be created as a network of sub-blocks with the same waveform synthesis blocks 68, 74 in the backcast and partial forecast branches 60, 62, a network of sub-blocks with only a single type of block, or a network of sub-blocks with different kinds of blocks. Selecting the best combination of branch types and block types for a given forecasting problem may be a hyper-parameter optimization problem, the specifics of which are not described in the present disclosure.

In practice, simple selection blocks usually result in good performance. According to experiments with the residual DNN 30, network architectures with two types of waveform synthesis sub-blocks 68, 74 were used. A first type includes a polynomial function with an inverse Fourier transform. The second type includes a polynomial function with an inverse Wavelet transform. The architecture of the waveform synthesis sub-blocks 68, 74 may use three polynomial blocks, followed by three inverse Fourier blocks or inverse Wavelet blocks. Despite this simple architecture, very good results were obtained.

Single-Path Vs. Multi-Path Waveform Synthesis

Figure 4:
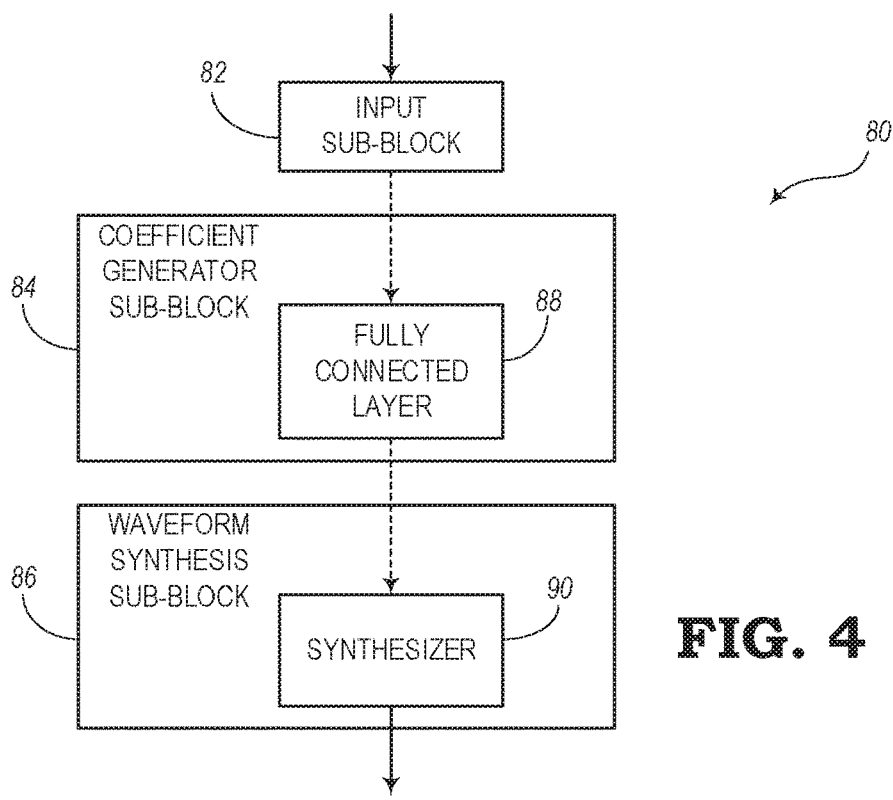
FIG. 4 is a block diagram illustrating a first implementation of the architecture of one of the branches of the processing block of FIG. 3, according to various embodiments.

FIG. 4 is a block diagram showing an embodiment of a branch 80 having a single-path architecture. For example, the branch 80 may represent one or both of the backcast branch 60 and partial forecast branch 62 of the DNN block 54. Like the branches 60, 62, the branch 80 also includes an input sub-block 82, a coefficient generator sub-block 84, and a waveform synthesis sub-block 86. In this embodiment, the branch 80 is a single path implementation and includes an input sub-block 82, a coefficient generator sub-block 84, and a waveform synthesis sub-block 86, similar to the architecture of the branches 60, 62 shown in FIG. 3. The branch 80 may utilize Fourier transforms.

In some embodiments, the input sub-block 82 may be optional and may simply be a passthrough. According to other embodiments, the input sub-block 82 may include a fully-connected layer. Also, the coefficient generator sub-block 84 may include a fully-connected layer 88 and may be a dense block for outputting coefficients $c_{(wh)i}$, $c_{(wh+1)i}$, $c_{(wh+wf)i}$. The waveform synthesis sub-block 86 may be configured to utilize a synthesizer 90 to synthesize the coefficient results of the fully-connected layer 88 of the coefficient generator sub-block 84. The synthesizer 90 is configured to implement partial forecasts $\hat{x}(w_h)$, $\hat{x}(w_h+1), \ldots, \hat{x}(w_h+w_f)$.

Figure 5:
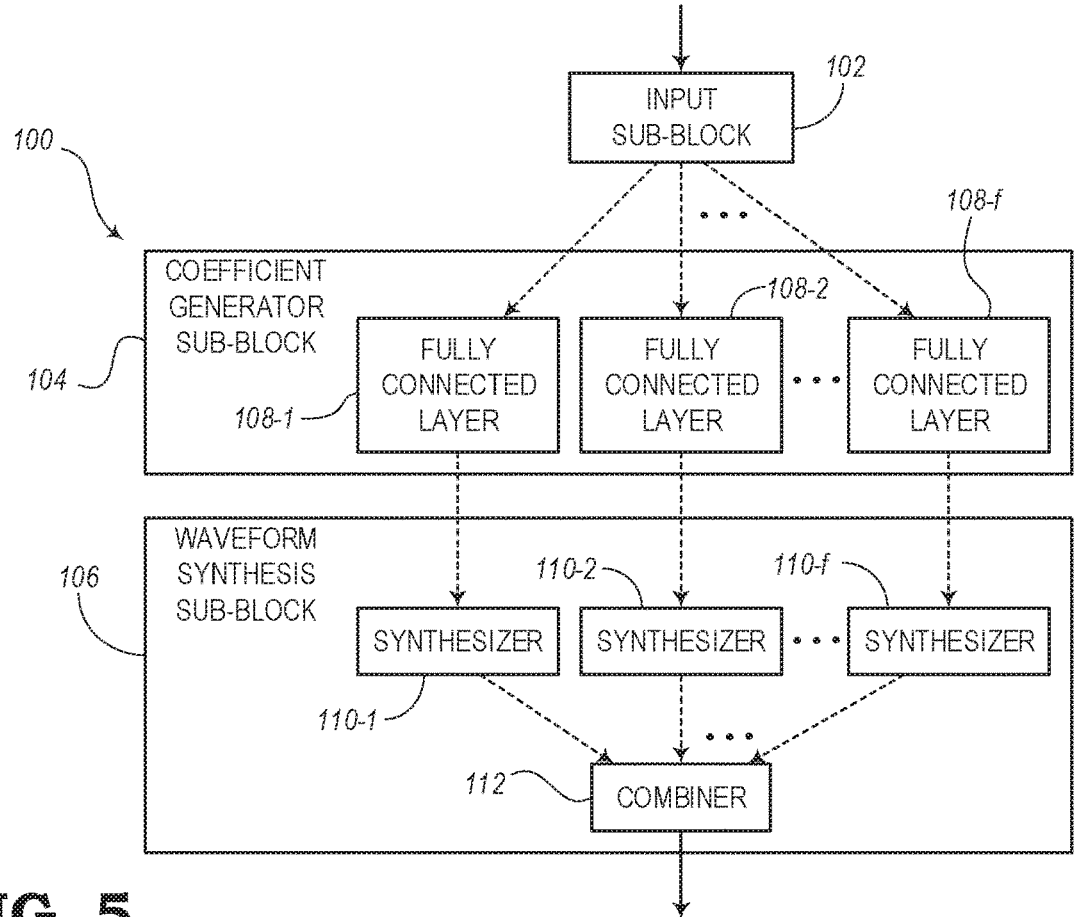
FIG. 5 is a block diagram illustrating a second implementation of the architecture of one of the branches of the processing block of FIG. 3, according to various preferred embodiments of the present disclosure.

FIG. 5 is a block diagram showing an embodiment of a multi-path architecture of a branch 100, including preferred characteristics of the residual DNN 30 and an improvement over the branch 80 shown in FIG. 4. The branch 100 may be any branch of any neural network. For example, the branch 100 in this embodiment may represent one or both of the backcast branch 60 and partial forecast branch 62 of the DNN block 54 of FIG. 3. The branch 100 includes parallel waveform generation and includes an input sub-block 102, a coefficient generator sub-block 104, and a waveform synthesis sub-block 106, similar to the architecture of the branches 60, 62 shown in FIG. 3 and the branch 80 of FIG. 4. However, in contrast to the single path used in the branch 80, the branch 100 of FIG. 5 includes parallel paths (e.g., referred to as "sub-branches") to enable individual processing of each time-series data point.

In some embodiments, the input sub-block 102 may be optional and may be configured as a passthrough. Alternatively, the input sub-block 102 may include a fully-connected layer. The input sub-block 102 supplies input processing results to multiple fully-connected layers 108-1, 108-2, . . . 108-$f$, where f represents the number of future windows for a number f of future time points. Thus, the coefficient generator sub-block 104 may utilize the plurality of fully-connected layers 108-1, 108-2, . . . , 108-$f$ in parallel to compute a coefficient for each of the time points. For example, the first fully-connected layer 108-1 is configured to output a coefficient $c_{whi}$ of a first portion of a historical window $w_h$ as mentioned above with respect to obtained time-series data. The second fully-connected layer 108-2 is configured to output the coefficient $c_{(wh+1)i}$ of a second portion of the historical window $w_h$. Also, the last fully-connected layer 108-$f$ is configured to output the coefficient $c_{(wh+wf)i}$ of a last portion of the historical window $w_h$ where the last window is the partial forecast for the future window of the time-series $w_f$. Coefficients of a time point are combined into a time waveform at the output layer.

The present disclosure describes two ways to implement the waveform generating function, which results in two different architectures for a waveform synthesis sub-block in a branch. The first way includes creating a waveform using the same set of coefficients for each time point in a single path of the branch 80, as described with respect to FIG. 4. However, the second way uses a different set of coefficients for each time point using multiple paths (or sub-branches) in the branch 100, as described with respect to FIG. 5. Conceptually, the first approach (FIG. 4) uses the same waveform generation function to generate each time point, while the second approach (FIG. 5) uses separate waveform generating functions to generate each time point.

In the parallel implementation of FIG. 5, which may be considered to be a preferred embodiment, the coefficient generator sub-block 104 generates separate coefficients for every time-point, meaning that if there are k timepoints in the partial forecast (or backcast), there are k sets of coefficients and therefore k separate time-series waveforms generated for each time point. The waveforms are combined (e.g., added) to create a complete waveform for all k points. A combiner 112 may be used to add the waveforms, or the combiner 112 may be implemented as a dense layer. The advantage of using the dense layer for the combiner 112 is that it allows for a change of tensor dimensions from the k time-points to the output of the sub-block. This portion of the forecast, represented by the embodiment of FIG. 5, accounts for a large portion of the final results of the forecast. For example, the processes corresponding to the embodiment shown in FIG. 5 may account for about two-thirds of the total output of the forecast.

The waveform synthesis sub-block 106 is configured to synthesize separate time waveforms for each time point in each sub-branch. The waveform synthesis sub-block 160 includes multiple synthesizers 110-1, 110-2, . . . , 110-$f$. The synthesizers 110-1, 110-2, . . . , 100-$f$ are configured to operate on the results of the corresponding fully-connected layers 108-1, 108-2, . . . , 108-$f$ of the coefficient generator sub-block 104. The parallel sub-branches of the coefficient generator sub-block 104 generate coefficients for time points indexed by $w_h, \ldots, w_h+w_f$, used to synthesize waveforms for each time-point $\hat{x}(w_h), \ldots, \hat{x}(w_h+w_f)$, which are combined at the output of the branch 100. Synthesis of the time-points is done by means of waveform generating functions of the synthesizers 110-1, 110-2, . . . , 110-$f$ of the waveform synthesis sub-block 106. The synthesized results are combined by a combiner 112 of the waveform synthesis sub-block 106. The combiner 112 provides the output of the branch 100, which may represent a partial forecast that can be added by adders 46, 48, 50 (FIG. 2), or may represent a backcast that can be subtracted using subtractors 40, 42, 44.

Generating Waveforms with the Inverse Wavelet Transform

Through experimentation, it has been discovered that an especially effective waveform generating function is the inverse Wavelet transform. Although traditional processes may typically utilize the inverse Fourier transform, it has been determined that the inverse Fourier transform is unable to properly fit to many waveforms due to its inaccuracy in extracting frequency when the waveform is partially periodic or when the considered window size is not long enough to encompass a full cycle of a period. Instead, the inverse Wavelet transform, which may be utilized in some embodiments of the present disclosure, is better at localizing frequencies in time and therefore has a better forecasting performance.

Figure 6:
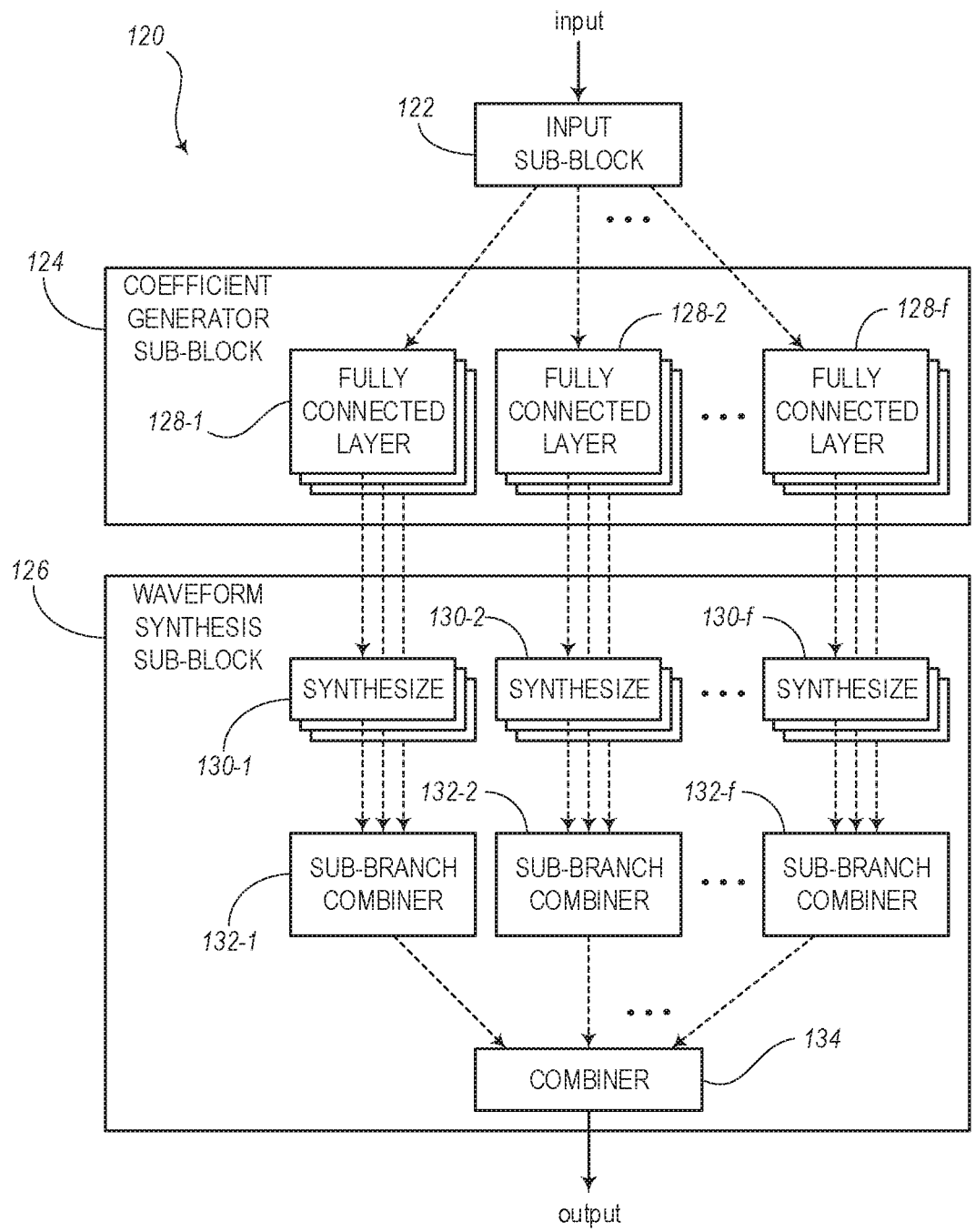
FIG. 6 is a block diagram illustrating a third implementation of the architecture of one of the branches of the processing block of FIG. 3, according to other various preferred embodiments of the present disclosure.

FIG. 6 is a block diagram showing an embodiment of a branch 120 that may be utilized in a residual DNN, such as the residual DNN 30 of FIG. 2. The branch 120 of FIG. 6 is an improvement over the branch 80 shown in FIG. 4. The branch 120 may represent one of the branches 60, 62 of the DNN block 54 of FIG. 3 and may, therefore, be configured as either a backcast branch or a partial forecast branch. The branch 120 includes similarities to the branches 80, 100 shown in FIGS. 4 and 5 and also include an input sub-block, a coefficient generator sub-block, and a waveform synthesis sub-block. However, the branch 120 further includes an architecture that enables the use of the inverse Wavelet transform by allowing different scaling factors for each of the fully-connected layers and synthesizers. Compared to branch 100, branch 120 also further includes an architecture that generates a separate set of coefficients or parameters for each time point used as parameters in the waveform generating function.

Again, an input sub-block 122 may be optional in this embodiment and may be configured as a passthrough. Alternatively, the input sub-block 122 may be a fully-connected layer. A coefficient generator sub-block 124 of the branch 120 may include parallel paths or sub-branches, similar to the embodiment of FIG. 5. Each sub-branch includes a group 128-1, 128-2, . . . , 128-$f$ of fully-connected layers. The groups of fully-connected layers 128-1, 128-2, . . . , 128-$f$ allow the coefficient generator sub-block 124 to compute coefficients for each respective time point. Furthermore, each group 128-1, 128-2, . . . , 128-$f$ in each sub-branch represents a respective time point and is expanded to enable various scaling factors to be applied to each of the time-point sub-branches. Although FIG. 6 shows three fully-connected layers in each group 128 within each sub-branch, it should be noted that each group 128 may include any number of fully-connected layers 128 to provide any number of different scaling factors for that time point. Therefore, for each time point, multiple iterations of coefficients are generated for the time point at different scaling factors.

The branch 120 further includes groups 130-1, 130-2, . . . , 130-$f$ of synthesizers in the waveform synthesis sub-block 126. The groups of synthesizers 130-1, 130-2, . . . , 130-$f$ receive the results from the corresponding groups of fully-connected layers 128-1, 128-2, . . . , 128-$f$ of the coefficient generator sub-block 124. Thus, each group of the groups 130-1, 130-2, . . . , 130-$f$ of synthesizers can synthesize the corresponding coefficients from the respective groups of fully-connected layers 128-1, 128-2, . . . , 128-$f$ of the coefficient generator sub-block 124 to obtain multiple synthesized waveforms for each of the multiple sub-branches. The multiple outputs from each group of synthesizers 130 in a sub-branch are combined by a corresponding sub-branch combiner 132-1, 132-2, . . . , 132-$f$ in the waveform synthesis sub-block 126. From the sub-branch combiners 132, the coefficients of the multiple time points are combined into a time waveform by a combiner 134 at the output layer of the branch 120. The multiple synthesis blocks (i.e., synthesizers 130) in each sub-branch may correspond to different scaling factors that can be used in a Wavelet transform or inverse Wavelet transform.

Therefore, with the architecture of FIG. 6, it is possible to use the inverse Wavelet transform for multiple scaling factors. Each sub-branch generates a waveform for a time-point which are combined by sub-branches combiners 132. To enable inverse Wavelet transform, coefficients for multiple scaling of the Wavelet transform are generated. In addition to parallel sub-branches, each element can be expanded to a group of elements to include multiple vertical stacks in each sub-branch corresponding to a scaling in the Wavelet transform. The coefficient generator sub-block 124 generates coefficients for each time-point at each resolution of the Wavelet transform, and these are passed to inverse Wavelet transform generators for each time-point at each scaling. The outputs of the synthesis are combined across the sub-branch (at each scaling) by the sub-branch combiners 132 and at the end of the branch 120 for the time-points.

Training the Forecaster

The DNN-based forecaster described in this disclosure has a very high predictive capacity, which leads to its good performance. To take advantage of the high predictive capacity, the forecaster needs a lot of data for training. A single network can be trained on all available time-series, and the trained model can be used to forecast each of the time-series. Unlike previously known approaches for forecasting network time-series information, the embodiments of the present disclosure train one classifier for a number of time-series in the same class of time-series. By using the forecaster described in the present disclosure, it is conceivable that the present forecaster will result in significant computational savings when adaptively trained while the network operates.

In order to increase the amount of information used in the training of the network, various strategies can be employed. One key strategy may be to capture as much of the information in the available training data by using a boosting process. In boosting, the dataset is split into multiple datasets, which may be used to train the model. One way to create mutually non-overlapping datasets is to select subsets of the time-series randomly without replacement. Another way may be to use clustering or the results of training the network to separate time-series into groups where the forecasters are similar. With the disjoint datasets, training can proceed with 1) multiple models being trained to a very low loss function and their output combined during forecasting using ensemble learning, or 2) hierarchical optimization used during training, whereby, in each training epoch, the loss function of multiple models is moved forward with a batch of training data, and the gradient is calculated jointly for all models using hierarchical optimization update rules.

Processing of the Time-Series

As with many other forecasting approaches, it may be necessary to process time-series before they are used for training and forecasting. In the realm of using forecasting for improving or optimizing a telecommunications network, some pre-processing approaches may be used to improve the performance of the network. For example, these pre-processing actions may include scaling, converting into decibels, passing through a sigmoid function, removing outliers, replacing missing values with the mean of the time-series, replacing missing values with zeros, or other suitable pre-processing operations.

Training may involve backcast/forecast output sub-block. The forecast of the forecasting system may be the sum of partial forecasts:

$$\hat{x}(t_0 + w_h\Delta, t_0 + \Delta, \ldots, t_0 + (w_h + w_f)\Delta) = \sum_{l=1}^{L} f_l^{forecast}(c_1, \ldots, c_{n_l})$$

Partial forecast functions map coefficients $c_1, \ldots, c_{n_l}$, calculated by the forecast sub-block into the output space of the network:

$$f_l: \mathbb{R}^{n_l} \to \mathbb{R}^p$$

The input of each block is defined recursively using the backcast:

$$x_l = x_{l-1} - f_l^{backcast}(c_1, \ldots, c_{m_l})$$

By definition, $$x_0 = x(t_0, t_0+\Delta, \ldots, t_0+(h-1)\Delta)$$

Example of Polynomial Output Layer

Polynomial regression of degree p, where every future time point has its own polynomial can be expressed as follows:

$$\hat{x}(t_0 + (w_h + k\Delta)\Delta) = \sum_{i=0}^{p_k} c_{ki}(t_0 + k\Delta)^i, k = 0, \ldots, w_f$$

In a special case, polynomials for all time points are the same:

$$p_k = p, t_0 = 0, c_{w_h 1} = c_{(w_h+1)2} = \cdots = c_{(w_h+w_f)p}$$

$$\hat{x}(t_0 + w_h\Delta, \ldots, t_0 + (w_h + w_f)\Delta) = \sum_{i=0}^{p}[c_{i1}(w_h\Delta)^i, \ldots, c_{ip}((w_h + w_f)\Delta)^i]$$

Example of Fourier Transform Output Layer

N-point inverse Fourier transform produces an upsampled time signal with each point defined by:

$$\hat{x}\left(t_0 + \left[w_h + \frac{k}{N-1}w_f\right]\Delta\right) = \sum_{n=0}^{N-1} c_{kn} e^{-i\frac{2\pi}{N}kn}, k = 0, \ldots, N-1$$

To obtain the forecast sampled at the intervals $$\Delta, \hat{x}(t_0+w_h\Delta, t_0+0, \ldots, t_0+(w_h+w_f)\Delta),$$

the output of the forecaster should be down-sampled (decimated) by a factor of $(N-1)w_f/\Delta$.

Having a distinct set of $c_{k1}, \ldots, c_{k(N-1)}$ for each time point k, is equivalent to representing the estimate of the signal with the short-term Fourier transform. Having the same set of $c_{k1}, \ldots, c_{k(N-1)}$ for each time point k, is equivalent to representing the estimate of the signal with the Fourier transform. Having k=N−1 down-samples the forecasted time-series arbitrarily to the number of points required for a forecast.

Figure 7:
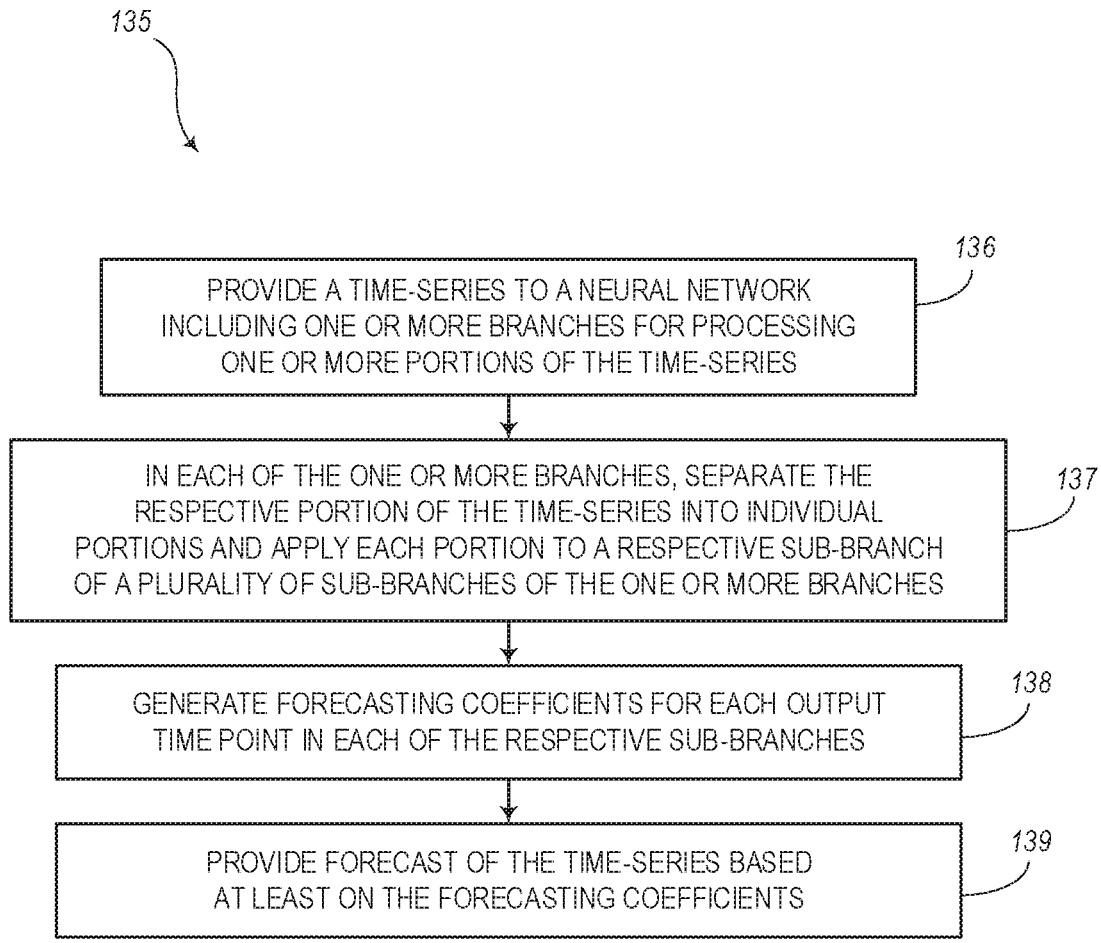
FIG. 7 is a flow diagram illustrating a first method for calculating a forecast, according to various embodiments of the present disclosure.

FIG. 7 is a flow diagram showing an embodiment of a method 135 for calculating a forecast from a time-series. The method 135 includes a step of providing a time-series to a neural network including one or more branches for processing one or more portions of the time-series, as indicated in block 136. In each of the one or more branches, the respective portion of the time-series is separated into individual portions and each portion is applied to a respective sub-branch of a plurality of sub-branches of the one or more branches, as indicated in block 137. The method 135 also includes the step of generating forecasting coefficients for each output time point in each of the respective sub-branches, as indicated in block 138. Also, the method includes providing a forecast of the time-series based at least on the forecasting coefficients, as indicated in block 139.

Figure 8:
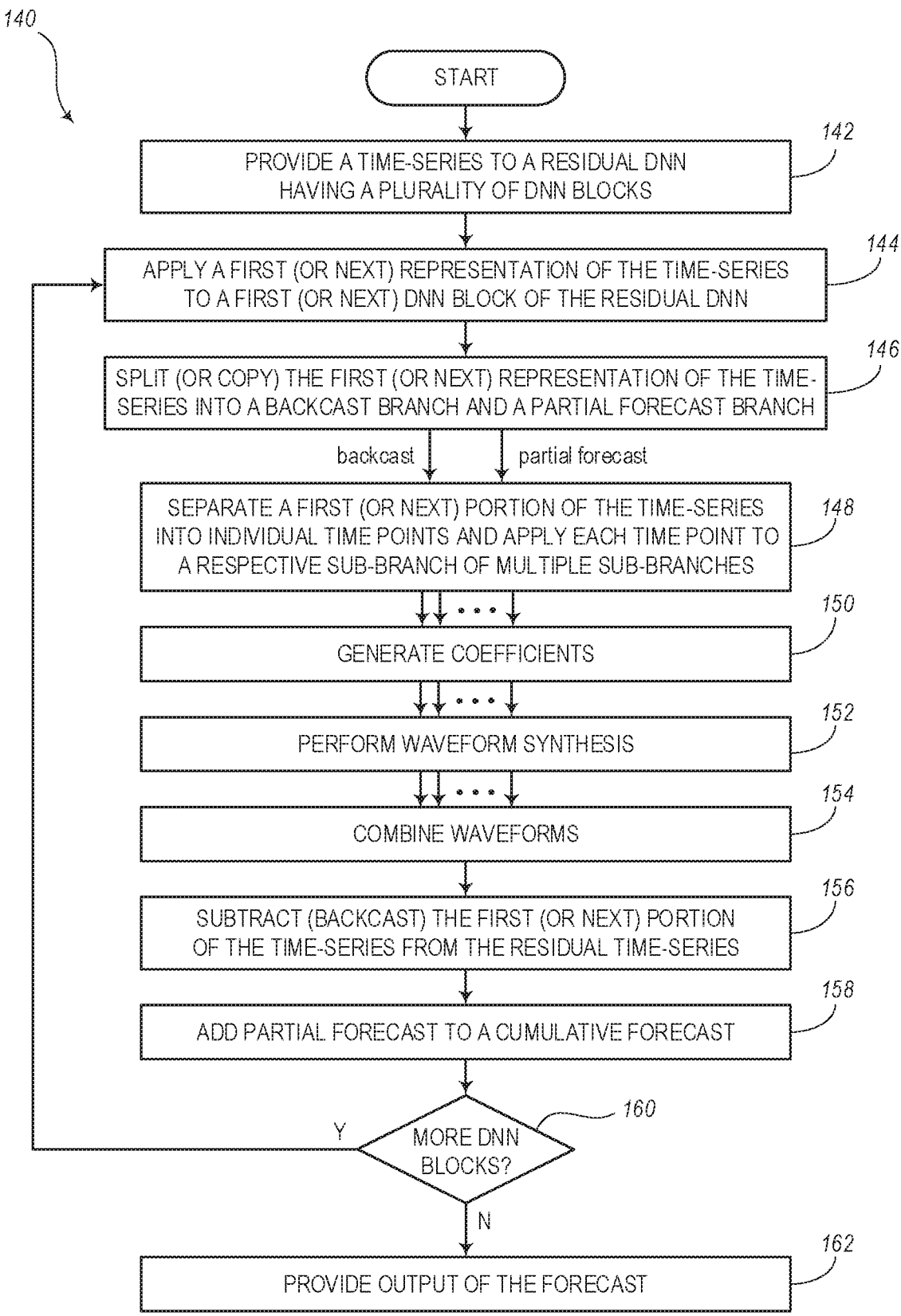
FIG. 8 is a flow diagram illustrating a second method for calculating a forecast, according to various embodiments of the present disclosure.

FIG. 8 is a flow diagram of an embodiment of a method 140 for calculating a forecast from a time-series. The method 140 includes a step of providing a time-series to a residual Deep Neural Network (DNN) having a plurality of DNN blocks, as indicated in block 142. In one example, the residual DNN that receives the time-series may be similar to or the same as the residual DNN 30 shown in FIG. 2. The method 140 also includes the step of applying a first representation of the time-series to a first DNN block of the residual DNN, as indicated in block 144. When this step 144 is repeated, a second (residual) representation of the time-series is applied to a second DNN block, then a third representation, then a fourth representation, and so on, depending on the number of DNN blocks that are contained in the residual DNN.

The method 140 further includes splitting, or copying, the first (or next) representation of the time-series into a backcast branch and a partial forecast branch, as indicated in block 146. The method 140 is shown with two arrows signifying the two different branches, where the processing in each branch may be similar. Although the flow diagram of FIG. 8 only shows one branch, it should be noted that the following steps (e.g., blocks 148, 150, 152, 154, 156, 158) may be executed for each of the two branches in parallel. As indicated in block 148, the first (or next) portion of the time-series is separated into individual time points and each is applied to a respective sub-branch of a plurality of sub-branches. In other words, each branch (i.e., the backcast branch and the partial forecast branch) includes a plurality of sub-branches where each sub-branch is dedicated to one particular time point of the time-series representation produced by the block. The method 140 is configured to produce two representations—the backcast (block 156) and the forecast (block 158). Each representation (i.e., backcast or forecast) may be a combined result (block 154) of coefficients produced in block 150 passed to the waveform synthesis (block 152), which may be produced in parallel for each time-point in the backcast/forecast representation. Therefore, instead of processing all the time points in a single path, as is normally done in conventional systems, the methods of the present disclosure include producing a representation of each time point individually and then combining the representations into a common representation for the backcast/forecast time-series. The flow diagram of FIG. 8 further shows multiple sub-branches where the steps represented by blocks 150 and 152 include multiple sub-branches repeated for each individual time point.

Once the time-series representation is split/copied into individual sub-branches of each output time point, the method 140 of FIG. 8 includes generating coefficients for each of the time points, as indicated in block 150. Then, the method 140 includes the step of performing waveform synthesis on the generated coefficients for each of the individual time points, as indicated in block 152. According to block 154, the waveforms from the multiple sub-branches are combined together, which may be done by addition or passing the outputs of parallel branches through a DNN block. At this point, the processing throughout the two branches (i.e., the backcast branch and the partial forecast branch) for a DNN block of a respective portion of the time-series is complete.

When the DNN block is completed, the method 140 includes subtracting (or backcasting) the first portion of the time-series from the time-series to obtain a residual time-series, or, for subsequent DNN blocks, subtracting the next portion of the time-series from the residual time-series, as indicated in block 156. The portion to be subtracted may be determined during the processing executed in the backcast branch. A most significant information of the time-series may be processed using the first DNN block, and then that information is removed from the time-series. Then, the next most significant information of the time-series may be processed using the second DNN block, and then that portion is removed from the residual time-series. This process is repeated for the number of DNN blocks are available in the residual DNN. When the last DNN block is run, there would nothing left to subtract at this point, so block 156 may be skipped in the last interaction.

In block 158, the method 140 describes the step of adding a partial forecast to a cumulative forecast. In other embodiments, the addition of the partial forecasts may be replaced with a DNN block, such as a fully-connected block. The partial forecast is determined by the processing that takes place in the partial forecast branch. When the first portion of the time-series is processed, the partial forecast has nothing to which to add and, therefore, may include storing this partial forecast. Therefore, when the second (or subsequent) partial forecasts are calculated, they can be added to the first partial forecast or any subsequent cumulative forecast.

The method 140 further includes a decision diamond 160, which indicates the step of determining if more DNN blocks are available. If so, the method 140 returns back to block 144 for processing the next portion of the time-series with the next DNN block. If it is determined in block 160 that no more DNN blocks are available, the method 140 proceeds to block 162, which indicates that the output of the forecast is provided. At this time, the forecast may be provided to a network administrator who may then make decisions about how the information from the forecast may be used to improve or optimize the network. Otherwise, in some embodiment, the decision module 26 may be utilized to automatically adjust or change aspects of the network to improve or optimize the performance of the network.

Therefore, according to the various embodiments described in the present disclosure, a neural network may be provided for calculating the coefficients of an inverse Wavelet transform, which is being used to approximate the past values of a time-series to train a forecasting model and to forecast future values of the time-series using the forecasting model. Also provided is a forecasting method using a neural network which synthesizes a separate time-waveform function for each time point. Each future point may have its own forecaster sub-branch contained in the same neural network. The method can be implemented through the means of generating a separate set of coefficient/parameters for each time point, and these coefficients are used as parameters of a waveform generating function.

According to some embodiments, a forecasting method for a network time-series is provided. The forecasting method may include training a single forecasting model on all time-series (of the same type) that is then used to forecast any of the time-series in its training set for future time points. For example, in a network where there are a thousand optical waves, the approach in this disclosure may include training a single forecaster for all the optical waves.

The method 140 can also be used for time-series data in other fields. For example, a single forecaster may be trained for all stocks listed in a stock exchange and used to then forecast individual stocks. In another use, the method may be used to train a single forecaster on heart monitoring measurements collected from many patients and then used to forecast the heart health of each individual patient. In yet another use, the method 140 may be used to train a single forecaster on traversal times of multiple vehicles on all the streets in a city or other area, while the forecaster can then be used to forecast future traversal times on these streets during a new route calculation.

In terms of performance of the present forecasters, or forecasting methods, algorithms, systems, etc. of the present disclosure, the forecasters may have a performance gain of 50% greater than other approaches. In other words, when the present forecasters are subjected to the M4 quarterly dataset, the present forecasters displayed a relative error of about 5.17%, as compared with the best-known forecasters, which displayed a relative error of about 9.37%. A large percentage (about 35%) of that gain comes from creating a separate forecast function for each forecasted time point (FIGS. 5-6), while an additional percentage (about 15%) of the gain comes from using the Wavelet transform as described with respect to FIG. 6. The additional 15% gain allows the present forecaster to fall within a crucial error range of around 5%, which is exceptional for any system and especially exceptional for a forecasting method.

The forecasters described in this disclosure have run on the M4 competition dataset. The performance results are shown in the table 170 of FIG. 9. The dataset contains close to a hundred thousand data points of a time-series with different seasonality and trends and from different sources (i.e., financial, manufacturing, economic, and other types of data sources). The time-series has been grouped as yearly, monthly, and quarterly depending on how frequently they are sampled. This dataset has been collected over a period of about 40 years and is the gold standard used to validate time-series forecasters. While the M4 dataset is not exactly a network-oriented data set, it has similarities to network data (e.g., seasonality, trends), and it shows the applicability of the present forecasters to a wider field of problems than just the environment of networking.

Different versions of the presently-described forecasters are shown with other publicly published forecasters. For example, the table 170 includes the M4 competition winner, the N-BEATS forecaster, and three versions of embodiments of forecasters described in the present disclosure. The first version of the present forecasters is a single-path Fourier-based forecaster that uses an inverse Fourier transform for waveform generation as described with respect to FIG. 4. The second version is a multi-path Fourier-based forecaster that uses an inverse Fourier transform for waveform generation as described with respect to FIG. 5. The third version, which has the greatest performance, is a multi-path Wavelet-based forecaster that uses an inverse Wavelet transform for waveform generation as described with respect to FIG. 6.

Based on the results shown in table 170 of FIG. 9, the Wavelet-based forecaster of the present disclosure improves relative forecast accuracy 46.5%-53% over the winner of the M4 forecasting competition held in 2018. For example, the average relative forecast error of the M4 competition winner on a dataset is 9.7%, while the average relative error of the Wavelet-based forecaster is 5.2%, which is an improvement of $46.5% over the M4 winner. Using the same comparison methodology, the Wavelet-based forecaster is 44.8%-52.8% better than the N-BEATS forecaster, which was published in May 2019 and is currently the best publicly known forecaster.

In additional experiments, the second and third versions of the forecasters described in the present disclosure were compared with the Kaggle competition winner using another publicly available dataset. The Kaggle competition forecasting dataset includes web traffic data. The winning forecasters of the Kaggle competition used a Long Short-Term Memory (LSTM) input layer and submitted results close to 800 times, presumably while optimizing hyper-parameters. The forecasters described in the present disclosure achieved better performance out of the box, without any hyper-parameter training.

FIG. 10 shows another table 180 displaying a summary of the results of a Kaggle forecaster competition and the results of the forecasters of the present disclosure. The Kaggle competition uses a time-series having 145,000 data points. The Wavelet-based forecaster of the present disclosure performed 12.4% better than the winner of the Kaggle competition. Also, the Wavelet-based forecaster doubles the performance gain of the Fourier-based forecaster of the present disclosure, likely due to the fact that the Kaggle dataset contains very complex periodic patterns that make it difficult for the Fourier approach to fit to.

In addition to the accuracy improvements as explained above, the embodiments of the forecasters of the present disclosure can significantly reduce the time to train forecasting models. Also, the present forecasters require less memory for the forecasting model. Preliminary results indicate that the forecasters of the present disclosure may be on the order of hundreds or even thousands of times faster than some well-known forecasters, which can reduce cloud costs.

Also, the forecasters of the present disclosure are computationally cheaper to use than current approaches. The present forecasters have the ability to train forecaster models with many sets of time-series and produce a single trained model to use for forecasting any of the time-series used in training. In some uses, the present forecasters can obtain time-series data of a network with 50,000 base stations, for example, where a network administrator may wish to utilize the present forecasters to calculate the load of each node or to calculate the Signal to Interference-plus-Noise Ratio (SINR) of each user.

Another advantage is that the present forecasters require little to no human input. The algorithms of the forecasters do not need a forecasting expert to pick a statistical model of the time-series. Instead, the architecture of the present forecasters includes a very high predictive capacity and picks a model during training that best fits the time-series. Also, the present forecasters do not need to use hyper-parameter training, which may be required for other forecasters.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A non-transitory computer-readable medium configured to store a forecasting module having instructions which, when executed, cause a processing device to:
provide a time-series, which was obtained from a telecommunications network and which is Performance Monitoring (PM) data that characterizes some conditions or features of the telecommunications network, to a neural network including one or more branches for processing one or more portions of the time-series, wherein the neural network is trained for a plurality of time-sets from historical operation with the plurality of time-sets related to a similar aspect in the telecommunications network as the time-series,
in each of the one or more branches, separate the respective portion of the time-series and apply each portion to a respective sub-branch of a plurality of sub-branches of the one or more branches,
generate forecasting coefficients for each output time point in each of the respective sub-branches, and
provide a forecast of the time-series based at least on the forecasting coefficients.

2. The non-transitory computer-readable medium of claim 1, wherein the step of generating forecasting coefficients for each time point further includes the step of performing multiple coefficient generating processes using different scaling factors to calculate multiple coefficient iterations for each time point in each respective sub-branch.

3. The non-transitory computer-readable medium of claim 2, wherein the instructions further cause the processing device to synthesize waveforms for each of the coefficient iterations for each time point in each respective sub-branch.

4. The non-transitory computer-readable medium of claim 3, wherein the step of synthesizing waveforms for each of the coefficient iterations includes the step of performing inverse Wavelet transform using different scaling factors.

5. The non-transitory computer-readable medium of claim 1, wherein the forecasting module includes a residual Deep Neural Network (DNN) having a plurality of DNN blocks, each DNN block including a backcast branch and a partial forecast branch for processing a respective portion of the time-series, and wherein the instructions further cause the processing device to
subtract a processed portion of the time-series from a residual time-series for processing another portion of the time-series with a subsequent DNN block, and
add a partial forecast to a cumulative forecast to obtain a forecast output.

6. The non-transitory computer-readable medium of claim 1, wherein the instructions further cause the processing device to
obtain the time-series from the telecommunications network, and
use a forecast output to determine actions for improving or optimizing the telecommunications network.

7. The non-transitory computer-readable medium of claim 1, wherein the instructions further cause the processing device to
training the neural network on all time-sets related to the similar aspect in the telecommunications network, such that the neural network is utilized for the forecast of any of the time-sets used in the training.

8. The non-transitory computer-readable medium of claim 1, wherein the time-series is one of partially periodic and includes a window size not long enough to encompass a full period.

9. The non-transitory computer-readable medium of claim 1, wherein the waveform is synthesized to generate a separate time-waveform function for each future point such that each future point has its own forecaster contained in the same neural network.

10. A computing system comprising:
a processing device, and
a memory device configured to store a forecasting module, the forecasting module including instructions which, when executed, cause the processing device to
provide a time-series, which was obtained from a telecommunications network and which is Performance Monitoring (PM) data that characterizes some conditions or features of the telecommunications network, to a neural network including one or more branches for processing one or more portions of the time-series, wherein the neural network is trained for a plurality of time-sets from historical operation with the plurality of time-sets related to a similar aspect in the telecommunications network as the time-series,
in each of the one or more branches, separate the respective portion of the time-series into individual portions and apply each portion to a respective sub-branch of a plurality of sub-branches of the one or more branches,
generate forecasting coefficients for each output time point in each of the respective sub-branches, and
provide a forecast of the time-series based at least on the forecasting coefficients.

11. The computing system of claim 10, wherein the step of generating forecasting coefficients for each time point further includes the step of performing multiple coefficient generating processes using different scaling factors to calculate multiple coefficient iterations for each time point in each respective sub-branch.

12. The computing system of claim 11, wherein the instructions further cause the processing device to synthesize waveforms for each of the coefficient iterations for each time point in each respective sub-branch.

13. The computing system of claim 12, wherein the step of synthesizing waveforms for each of the coefficient iterations includes the step of performing inverse Wavelet transform using different scaling factors.

14. The computing system of claim 10, wherein the forecasting module includes a residual Deep Neural Network (DNN) having a plurality of DNN blocks, each DNN block including a backcast branch and a partial forecast branch for processing a respective portion of the time-series, and wherein the instructions further cause the processing device to subtract a processed portion of the time-series from a residual time-series for processing another portion of the time-series with a subsequent DNN block, and
add a partial forecast to a cumulative forecast to obtain a forecast output.

15. A method comprising:
providing a time-series, which was obtained from a telecommunications network and which is Performance Monitoring (PM) data that characterizes some conditions or features of the telecommunications network, to a neural network including one or more branches for processing one or more portions of the time-series, wherein the neural network is trained for a plurality of time-sets from historical operation with the plurality of time-sets related to a similar aspect in the telecommunications network the time-series;
in each of the one or more branches, separating the respective portion of the time-series into individual portions and applying each portion to a respective sub-branch of a plurality of sub-branches of the one or more branches;
generating forecasting coefficients for each output time point in each of the respective sub-branches; and
providing a forecast of the time-series based at least on the forecasting coefficients.

16. The method of claim 15, wherein the step of generating forecasting coefficients for each time point further includes the step of performing multiple coefficient generating processes using different scaling factors to calculate multiple coefficient iterations for each time point in each respective sub-branch.

17. The method of claim 16, further comprising the step of synthesizing waveforms for each of the coefficient iterations for each time point in each respective sub-branch.

18. The method of claim 17, wherein the step of synthesizing waveforms for each of the coefficient iterations includes the step of performing inverse Wavelet transform using different scaling factors.

19. The method of claim 15, wherein the neural network is a residual Deep Neural Network (DNN) having a plurality of DNN blocks, each DNN block including a backcast branch and a partial forecast branch for processing a respective portion of the time-series, and wherein the method further comprises the steps of
subtracting a processed portion of the time-series from a residual time-series for processing another portion of the time-series with a subsequent DNN block; and
adding a partial forecast to a cumulative forecast to obtain a forecast output.

20. The method of claim 15, further comprising the steps of
obtaining the time-series from the telecommunications network; and
using a forecast output to determine actions for improving or optimizing the telecommunications network.

* * * * *